United States Patent
Mickols et al.

(10) Patent No.: US 8,752,714 B2
(45) Date of Patent: Jun. 17, 2014

(54) SULFONATED POLY (ARYL ETHER) MEMBRANE INCLUDING BLEND WITH PHENYL AMINE COMPOUND

(75) Inventors: William E. Mickols, Chanhassen, MN (US); Mou Paul, Edina, MN (US); Abhishek Roy, Edina, MN (US)

(73) Assignee: Dow Global Technologies LLC, Midland, MI (US)

( * ) Notice: Subject to any disclaimer, the term of this patent is extended or adjusted under 35 U.S.C. 154(b) by 777 days.

(21) Appl. No.: 13/037,393

(22) Filed: Mar. 1, 2011

(65) Prior Publication Data
US 2012/0223010 A1 Sep. 6, 2012

(51) Int. Cl.
| B01D 39/00 | (2006.01) |
| B01D 39/14 | (2006.01) |
| B01D 71/68 | (2006.01) |
| B01D 71/60 | (2006.01) |

(52) U.S. Cl.
CPC ............... *B01D 71/60* (2013.01); *B01D 71/68* (2013.01)
USPC ............. 210/500.37; 210/500.41; 210/500.27

(58) Field of Classification Search
CPC ...... B01D 71/52; B01D 69/12; B01D 69/141; B01D 71/82; B01D 2325/022; B01D 67/0011; B01D 67/0093; B01D 69/08; B01D 71/68; B01D 71/80; B01D 61/025; B01D 61/027; B01D 69/04; B01D 71/60; B01D 68/04; C08F 220/28
USPC .................. 210/500.27, 500.38, 500.41, 490; 210/500.37; 264/41, 49; 429/535; 428/376
See application file for complete search history.

(56) References Cited

U.S. PATENT DOCUMENTS

| 4,761,233 A * | 8/1988 | Linder et al. ............. 210/500.37 |
| 4,818,387 A | 4/1989 | Ikeda et al. |
| 4,895,685 A | 1/1990 | Honda et al. |
| 4,920,193 A | 4/1990 | Hann et al. |
| 4,990,252 A | 2/1991 | Tomaschke et al. |
| 5,008,352 A * | 4/1991 | Hendy ........................... 525/534 |
| 5,067,971 A | 11/1991 | Bikson et al. |
| 5,246,582 A | 9/1993 | Sluma et al. |
| 5,304,307 A * | 4/1994 | Linder et al. .................. 210/490 |
| 5,496,637 A * | 3/1996 | Parham et al. ................ 428/376 |
| 5,693,740 A | 12/1997 | Colquhoun et al. |
| 5,997,741 A * | 12/1999 | Shimoda et al. ......... 210/500.27 |
| 6,194,474 B1 * | 2/2001 | Kerres et al. ..................... 521/27 |
| 6,248,931 B1 | 6/2001 | Davis et al. |
| 6,759,441 B1 | 7/2004 | Kerres et al. |
| 6,887,408 B2 | 5/2005 | Yuan |
| 7,132,496 B2 | 11/2006 | Kerres et al. |
| 7,160,927 B2 * | 1/2007 | Schindler et al. ............... 521/27 |
| 7,358,288 B2 | 4/2008 | Kerres |
| 7,361,729 B2 | 4/2008 | McGrath et al. |
| 7,368,526 B2 | 5/2008 | Yuan et al. |
| 7,387,732 B2 | 6/2008 | Kerres et al. |
| 7,462,233 B2 * | 12/2008 | Simpson et al. .............. 106/462 |
| 7,550,216 B2 * | 6/2009 | Ofer et al. ...................... 429/535 |
| 7,615,599 B2 | 11/2009 | Haering |
| 7,790,837 B2 | 9/2010 | McGrath et al. |
| 7,868,050 B2 * | 1/2011 | Schindler et al. ............... 521/27 |
| 7,882,963 B2 | 2/2011 | Mickols et al. |
| 7,913,857 B2 * | 3/2011 | Koo et al. ................. 210/500.38 |
| 8,028,842 B2 * | 10/2011 | McGrath et al. ......... 210/500.41 |
| 2005/0230305 A1 * | 10/2005 | Kulkarni et al. ......... 210/500.23 |
| 2006/0003210 A1 | 1/2006 | Ofer et al. |
| 2007/0163951 A1 | 7/2007 | McGrath et al. |
| 2008/0318134 A1 | 12/2008 | Kerres |
| 2010/0051538 A1 | 3/2010 | Freeman et al. |
| 2014/0002957 A1 * | 1/2014 | Casasanta, III ............... 361/502 |

FOREIGN PATENT DOCUMENTS

| EP | 1149625 | 10/2001 |
| WO | 2007135689 | 11/2007 |

OTHER PUBLICATIONS

Lee et al., Synthesis and characterization of sulfonated poly(arylene thioethers)s and their blends with polybenzimidazole for proton exchange membranes, Journal of Membrane Science (2007), vol. 294, p. 75-83.
Park, et al., Highly Chlorine-tolerant polymers for desalination, Angewandte Chemie International Edition, 2008, 47: p. 6108-6113.
Wang, et al., Direct polymerization of sulfonated poly(arylene ether sulfone) random statistical copolymers: candidates for new proton exchange membranes, Journal of Membrane Science (2002), vol. 197, p. 231-242.

* cited by examiner

*Primary Examiner* — Ana Fortuna
(74) *Attorney, Agent, or Firm* — Edward W. Black

(57) ABSTRACT

A membrane comprising a blend of a sulfonated poly(aryl ether) and a phenyl amine compound along with methods for making and using the same. Many additional embodiments are described including applications for such membranes.

13 Claims, No Drawings

SULFONATED POLY (ARYL ETHER) MEMBRANE INCLUDING BLEND WITH PHENYL AMINE COMPOUND

FIELD OF THE INVENTION

The present invention is generally directed toward poly (aryl ether) membranes along with methods for making and using the same.

DESCRIPTION OF THE RELATED ART

Poly(aryl ether) materials have been used as membranes for over thirty years, (e.g. see U.S. Pat. No. 4,818,387; U.S. Pat. No. 4,920,193; U.S. Pat. No. 4,990,252; U.S. Pat. No. 7,868,050; and EP 1149625). The open literature describes a wide variety of techniques for making various species of poly(aryl ethers) e.g. polysulfones, polyether ether ketone (PEEK), etc. along with techniques for post-sulfonation. U.S. Pat. No. 7,790,837 and US 2007/0163951 describe a class of polysulfones formed by copolymerizing a pre-sulfonated sulfone monomer with non-sulfonated monomers resulting in a polysulfone copolymer with a random distribution of sulfonated segments.

While poly(aryl ethers) offer superior oxidative resistance, they generally provide lower flux and salt rejection performance as compared with commercial polyamide membranes. This performance gap is most evident in nano-filtration and reverse osmosis applications but applies more generally in other applications.

BRIEF SUMMARY OF THE INVENTION

The invention includes a membrane comprising a blend of a sulfonated poly(aryl ether) and a phenyl amine compound along with methods for making and using the same. Many embodiments are disclosed including those which offer improved flux and/or salt rejection.

DETAILED DESCRIPTION OF THE INVENTION

The invention is not particularly limited to a specific type, construction or shape of membrane or application. For example, the present invention is applicable to flat sheet, tubular and hollow fiber forms including composite, anisotropic, isotropic, non-porous and porous structures. Such membranes may find utility in a variety of applications including pervaporation, gas separation, forward osmosis (FO), reverse osmosis (RO), nano filtration (NF), ultra filtration (UF) and micro filtration (MF) fluid separations. The invention is particularly useful for membranes designed for RO and NF separations. RO membranes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons.

The poly(aryl ethers) useful in the present invention are not particularly limited and include but are not limited to poly (aryl ether) sulfones, ketones, phosphine oxides and nitriles. A preferred class of poly(aryl ethers) comprise a repeating unit comprising a subunit represented by Formula (I):

Formula (I):

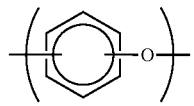

A preferred subclass of poly(aryl ethers) comprise polysulfones, including species comprising a repeating unit comprising a subunit represented by Formula (II):

Formula (II):

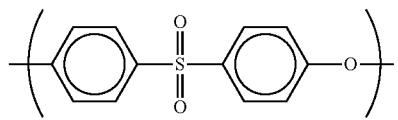

Representative repeating units of applicable polysulfones are illustrated by Formulae (III-VIII):

Formula (III):

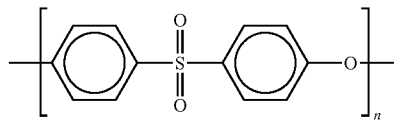

Formula (IV):

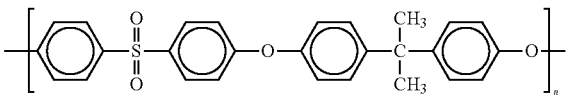

Formula (V):

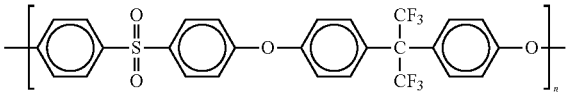

Formula (VI):

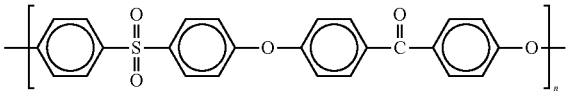

Formula (VII):

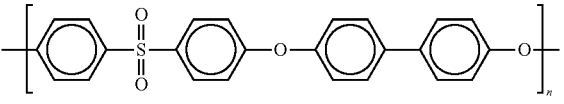

Formula (VIII):

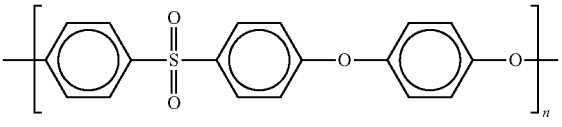

Another subclass of preferred poly(aryl ethers) comprise poly(ether ether ketones), including species comprising a repeating unit comprising a subunit represented by Formula (IX):

Formula (IX):

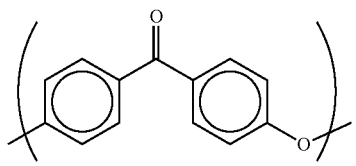

Another subclass of preferred poly(aryl ethers) comprise poly(aryl ether) phosphine oxides including species comprising a repeating unit comprising a subunit represented by Formula (X).

Formula (X):

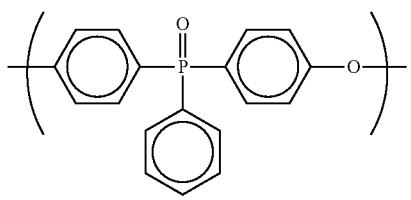

Another subclass of preferred poly(aryl ethers) comprise poly(aryl ether) nitriles including species comprising a repeating unit comprising a subunit represented by Formula (XI).

Formula (XI):

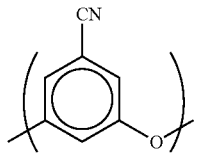

Applicable poly(aryl ethers) include homopolymers, copolymers and blends, e.g. blends with other non-(aryl ether) polymers such as polyalkylene oxides (e.g. polyethylene oxide) or multi-block copolymers based on poly(aryl ethers) and polybenzimidazole or anhydride terminated naphthalene based polyimides as described in: i) Lee et al., "Synthesis and characterization of poly(arylene ether sulfone)-b-polybenzimidazole copolymers for high temperature low humidity proton exchange membrane fuel cells," Polymer, 49 (2008), 5387-5396 and ii) Lee et al., "Segmented sulfonated poly(arylene ether sulfone)-b-polyimide copolymers for proton exchange membrane fuel cells. I. Copolymer synthesis and fundamental properties," Journal of Polymer Science, DOI: 10.102, 4879-4890, respectively. Applicable poly(aryl ethers) also include copolymers or blends of a plurality of different species of poly(aryl ethers) including sulfonated and non-sulfonated species. Applicable poly(aryl ethers) may also be synthesized from fused ring monomers including phenolphthalein or naphthalene derivatives.

In preferred embodiments, the subject poly(aryl ethers) comprises at least 50 molar percent (and more preferably at least 75 molar percent) of repeating units that comprise the subunit represented by Formula (I). Preferred poly(aryl ethers) have a weight average molecular weight (Mw) of from about 5,000 to 500,000 and more preferably from 10,000 to 250,000.

From 5 to 50 molar percent (and more preferably from 10 to 25 molar percent) of the total number of phenyl groups of the subject poly(aryl ethers) preferably include sulfonic acid moieties, i.e.

$$-SO_3Z$$

wherein Z is selected from: hydrogen, an alkali metal salt or a nitrogen containing salt derived from ammonium or amine. The addition of sulfonic acid moieties may be accomplished by well known post-sulfonation techniques, e.g. dissolving the poly(aryl ether) within a sulfonating solvent such as sulfuric acid, chlorosulfonic acid or other sulfonating agents, e.g. sulfur trioxide. More preferably, sulfonic acid moieties are added to the phenyl rings of a portion of the monomers used to prepare the poly(aryl ether), as represented below in Formula (XII) and as described in US 2007/0163951.

Formula (XII):

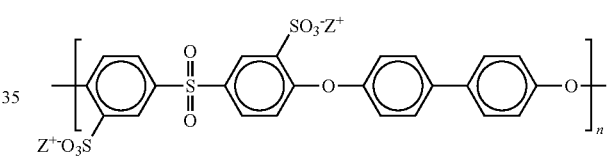

The degree of sulfonation can be determined by NMR techniques, infra-red spectroscopy or by titration, all of which are described in the literature and patent references cited above. While less preferred, the phenyl groups of the poly(aryl ether) may also include other substituent groups such as halogens, alkyls, amines, carboxylic acids, nitriles and hydroxyls. One preferred polysulfone is represented by Formula (XIII), hereinafter referred to as "BPS-20."

Formula (XIII):

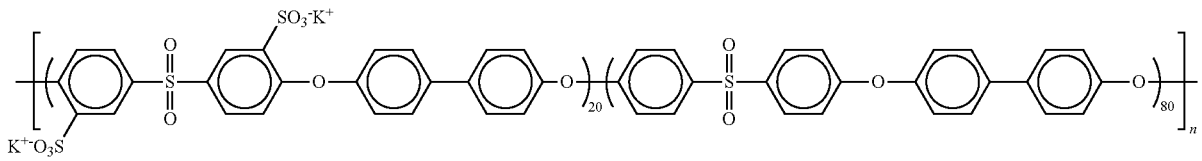

The preparation of BPS-20 and similar polysulfones is described in US 2007/0163951. In brief, a di-sulfonated monomer (e.g. 3,3'-disulfonated-4,4'-dichlorodiphenyl sulfone) is directly polymerized with 4,4'-biphenol and a non-sulfonated sulfone monomer (e.g. 4,4'-dichlorodiphenyl sulfone) in stoichiometric ratios to achieve the desired degree of sulfonation.

The phenyl amine compounds of the present invention are not particularly limited and different species may be used in combination. A preferred class of compounds is represented by Formula (XIV):

Formula (XIV):

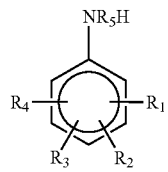

wherein $R_1$, $R_2$, $R_3$ and $R_4$ are independently selected from: alkoxy and alkyl having from 1 to 6 carbon atoms, amine, carboxylic acid, halogen, hydrogen, hydroxyl, nitro, phosphonate and thiol; and $R_5$ is selected from: hydrogen or alkyl having from 1 to 6 carbon atoms. The alkyl and "alky" portion of the alkoxy groups may be branched or unbranched, unsubstituted or substituted with hydroxyl, alkoxy, halogen, amine, nitro, phosphonate and thiol. In a preferred subset of embodiments, at least one of $R_1$, $R_2$, $R_3$ and $R_4$ is an amine. In another preferred subset of embodiments, at least one of $R_1$, $R_2$, $R_3$ and $R_4$ is hydrogen. In yet another subset of embodiments at least one of $R_1$, $R_2$, $R_3$ and $R_4$ is an amine and a hydrogen. In another subset of embodiments one of $R_1$, $R_2$, $R_3$ and $R_4$ is an amine and the remaining are selected from hydrogen and halogen. In still another subset of embodiments, $R_5$ is hydrogen. Species of phenyl amine compounds include: aniline, phenylenediamine (o-, m- and p-), fluoro-phenylenediamine (e.g. 4-fluoro-1,2-phenylenediamine), toluidine (o-, m- and p-), anisidine (o-, m- and p-), diaminoanisole and diaminobenzonitrile. Aniline, phenylenediamine (o-, m- and p-) and fluoro-phenylenediamine (e.g. 4-fluoro-1,2-phenylenediamine) are preferred, and aniline is particularly preferred for many applications.

The subject invention comprises blend of a sulfonated poly(aryl ether) and a phenyl amine compound. The nature of the blend is not particularly limited. In preferred embodiments, the blend comprises a reaction product of a sulfonated poly(aryl ether) and a phenyl amine compound. The term "reaction product" refers to a product resulting from a chemical reaction including the formation, rearrangement or destruction of a chemical bond. In a preferred embodiment, the term "reaction product" refers to product resulting from a chemical bond or attractive association formed between two compounds. By way of illustration, an idealized association between BPS-20 and m-phenylene diamine is represented in Formula (XV):

Formula (XV):

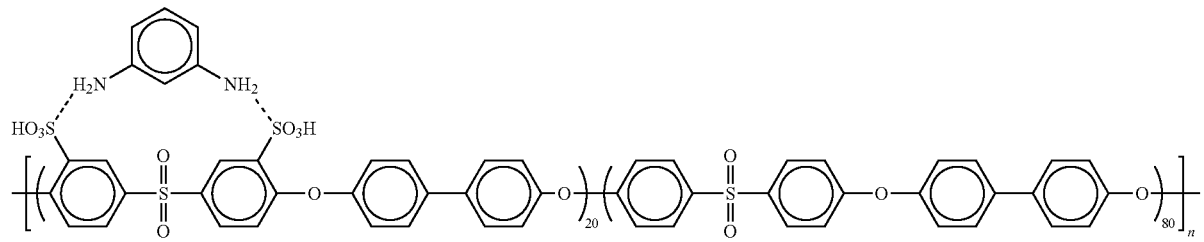

The technique for forming a blend or reaction product is not particularly limited and may be preformed by blending the sulfonated poly(aryl ether) and phenyl amine compound together within a solvent such as N-methylpyrrolidone (NMP), dimethylformamide (DMF), dimethylacetamide (DMAc), dimethylsufoxide, dioxane, chloroform or tetrahydrofuran. In some applications, a non-solvent may also be included. Examples of applicable non-solvents include: alcohols, e.g., 2-methoxyethanol, t-amyl alcohol, methanol, 1-butanol, ethanol, water, acetone, methylethylketone, butyl ether, glycerol, diethyleneglycol and surfactants such as TWEEN, 20, 40, 60 and 80. The mixture may cast, extruded or otherwise formed into a membrane via a classic phase inversion process as is well known in the art. In some embodiments, the mixture may be cast or applied to a substrate such as a porous support to form a composite structure. The poly(aryl ether) may be in acid, base or salt form. It may also be pre-swollen via a variety of known techniques described in the literature cited above, including being boiled in acid.

The reaction product is preferably derived from a combination of sulfonated poly(aryl ether) to phenyl amine compound in a weight ratio of from about 500:1 to 1:1, more preferably about 100:1 to 2:1 and in many embodiments from about 50:1 to 5:1.

In RO and NF applications, the porous support preferably includes pore sizes that are of sufficient size to permit essentially unrestricted passage of permeate but not large enough so as to interfere with the bridging over of the subject sulfonated polysulfone layer formed thereon. For example, the pore size of the support preferably ranges from about 0.001 to 0.5 micron. In some instances pore diameters larger than about 0.5 micron permit the sulfonated polysulfone membrane to sag into the pores and disrupt a flat sheet configuration. Examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

EXAMPLES

A series of casting mixtures were prepared using 13.5 wt. % BPS-20 mixture dissolved in DMF. In those samples including a phenyl amine compound, the phenyl amine compound was first dissolved in DMF and then added to a BPS-20 solution in an amount to yield a membrane having a total weight percent (grams phenyl amine compound/(grams phenyl amine compound+BPS-20)) as indicated in Table I. The resulting mixtures were thoroughly mixed, heated, cast at approximately 40-50° C. onto a clean glass plate using a 6 mil doctor blade and allowed to stand under an infrared heat lamp for approximately 12 hours. The samples were then transferred to a vacuum oven and dried at 90° C. for approximately 6 hours and left to cool to room temperature in a static vacuum for approximately 12 hours. The resulting sample membranes had thickness of approximately 11 µm. Coupons were cut from each sample membrane and a polyester web backing was applied to provide support. Sample coupons were tested in a test cell using a feed water including 2000 ppm NaCl at 600 psi. As shown by the results provide in Table I, each of the subject sample membranes showed improved flux as compared with a control membrane.

TABLE I

| Phenyl amine compound | Total weight percent: weight compound/wt. compound + BPS-20 | Flux (gfd) | Salt Passage (%) |
|---|---|---|---|
| Control | 0 | 0.11 ± 0.01 | 0.65 ± 0.05 |
| 2,4-diaminoanisole | 2.2% | 0.14 ± 0.02 | 1.1 ± 0.1 |
| m-phenylenediamine | 1.7% | 0.17 ± 0.02 | 0.87 ± 0.07 |
| 4-fluro-1,2-phenylenediamine | 1.9% | 0.18 ± 0.02 | 0.77 ± 0.03 |
| Aniline | 1.9% | 0.28 ± 0.06 | 0.80 ± 0.08 |

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The entire subject matter of each of the aforementioned patent documents is incorporated herein by reference.

The invention claimed is:

1. A membrane comprising a reaction product of a sulfonated poly(aryl ether) and a phenyl amine compound, wherein the poly(aryl ether) comprises a repeating unit comprising a subunit represented by Formula (I):

Formula (I):

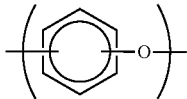

wherein from 5 to 50 molar percent of the total number of phenyl groups of the poly(aryl ether) include sulfonic acid moieties.

2. The membrane of claim 1 wherein the phenyl amine compound is represented by the Formula (XIV):

Formula (XIV):

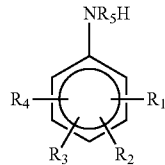

wherein $R_1$, $R_2$, $R_3$ and $R_4$ are independently selected from: alkoxy and alkyl having from 1 to 6 carbon atoms, amine, carboxylic acid, halogen, hydrogen, hydroxyl, nitro, phosphonate, thiol; and $R_5$ is selected from: hydrogen or alkyl having from 1 to 6 carbon atoms.

3. The membrane of claim 2 wherein at least one of $R_1$, $R_2$, $R_3$ and $R_4$ are an amine and hydrogen.

4. The membrane of claim 2 wherein one of $R_1$, $R_2$, $R_3$ and $R_4$ is an amine and the remaining are selected from hydrogen and halogen.

5. The membrane of claim 2 wherein $R_5$ is hydrogen.

6. The membrane of claim 1 wherein the phenyl amine compound is selected from at least one of: aniline, phenylenediamine, fluoro-phenylenediamine, toluidine, anisidine, diaminoanisole and diaminobenzonitrile.

7. The membrane of claim 1 wherein the phenyl amine compound is selected from at least one of: aniline, phenylenediamine and fluoro-phenylenediamine.

8. The membrane of claim 1 wherein the poly(aryl ether) is selected from at least one of: poly(aryl ether) sulfones, poly(aryl ether) ketones, poly(aryl ether) phosphine oxides and poly(aryl ether) nitriles.

9. The membrane of claim 1 wherein the poly(aryl ether) comprises a repeating unit comprising a subunit represented by Formula (II):

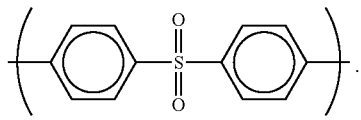

Formula (II)

10. The membrane of claim 1 wherein the membrane is a nano-filtration or reverse osmosis membrane.

11. The membrane of claim 1 wherein the membrane comprises an anisotropic structure.

12. The membrane of claim 1 wherein the membrane comprises a composite structure.

13. The membrane of claim 1 wherein the blend is formed by combining the sulfonated poly(aryl ether) and phenyl amine compound in a weight ratio of from 500:1 to 1:1.

* * * * *